United States Patent [19]

Sager

[11] 4,224,091
[45] Sep. 23, 1980

[54] METHOD OF PRODUCING CORNERS IN CHANNEL MATERIAL USING ULTRASONIC ENERGY

[75] Inventor: Thomas B. Sager, Newtown, Conn.

[73] Assignee: Branson Ultrasonics Corp., New Canaan, Conn.

[21] Appl. No.: 856,394

[22] Filed: Dec. 1, 1977

[51] Int. Cl.³ .................. B32B 31/18; A47G 1/06
[52] U.S. Cl. ....................... 156/73.3; 40/152;
 40/154; 40/549; 49/DIG. 2; 52/656; 156/73.1;
 156/204; 156/515; 156/580.2; 228/1 R;
 228/110; 403/401
[58] Field of Search ............... 40/152, 154, 549;
 49/504, 505, DIG. 2; 52/656; 156/73.1, 73.3,
 515, 580.2, 204; 228/1 R, 110; 403/401

[56] References Cited

U.S. PATENT DOCUMENTS

| | | | |
|---|---|---|---|
| 2,503,882 | 4/1950 | Medford | 156/155 |
| 2,516,417 | 7/1950 | Rado | 40/152 X |
| 2,794,221 | 6/1957 | Bedics | 156/92 X |
| 2,886,482 | 5/1959 | Huffman | 156/251 X |
| 3,562,041 | 2/1971 | Robertson | 156/73.3 X |
| 3,679,526 | 7/1972 | Horton | 156/73.3 X |
| 3,717,955 | 2/1973 | Urbanick | 52/656 X |
| 3,802,105 | 4/1974 | Bendix | 40/152 |
| 3,822,160 | 7/1974 | Barge et al. | 156/515 X |

Primary Examiner—John T. Goolkasian
Assistant Examiner—Robert A. Dawson
Attorney, Agent, or Firm—Ervin B. Steinberg; Philip J. Feig

[57] ABSTRACT

A method of producing a corner in thermoplastic flexible channel material having a base portion and at least one leg comprises flattening the leg portion outwardly while folding the material with a "U" bend upon itself to provide an overlapped base and leg portion. Ultrasonic energy is applied to the overlapped flattened leg portion for simultaneously sealing and cutting the overlapped leg portion at an oblique angle to the longitudinal axis of the channel material. Upon releasing the channel material, the material is restored to its original shape, but exhibiting a formed corner.

8 Claims, 7 Drawing Figures

U.S. Patent    Sep. 23, 1980    4,224,091
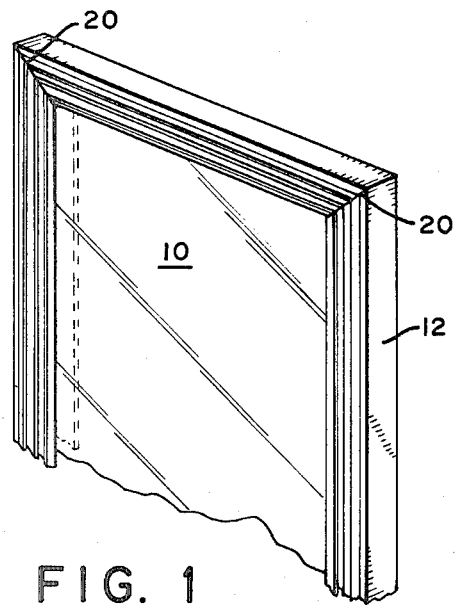
FIG. 1
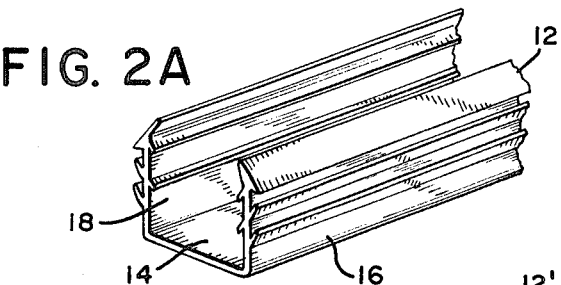
FIG. 2A
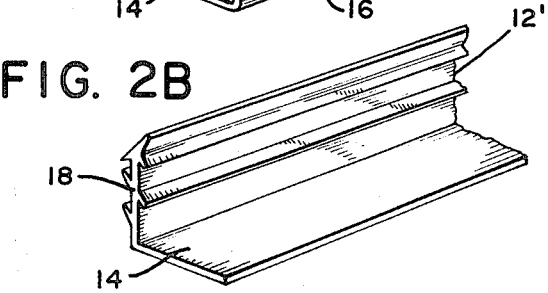
FIG. 2B
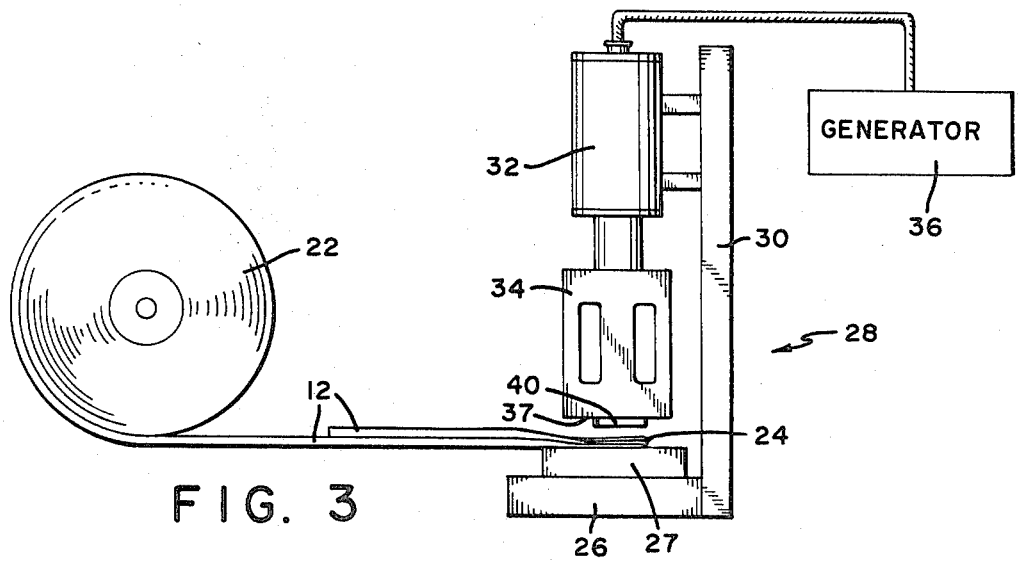
FIG. 3
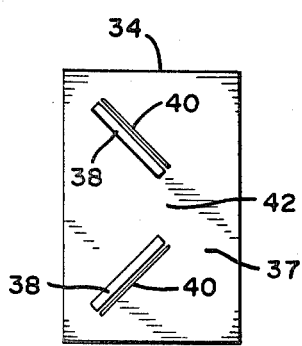
FIG. 4
FIG. 5
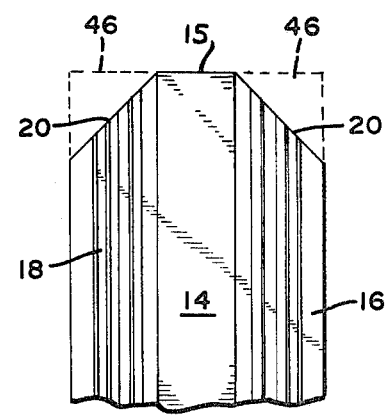
FIG. 6

METHOD OF PRODUCING CORNERS IN CHANNEL MATERIAL USING ULTRASONIC ENERGY

SUMMARY OF THE INVENTION

This invention relates to a method for producing corners in thermoplastic channel material by the application of ultrasonic energy.

More specifically, the invention concerns the transforming of strips of plastic material, such as that used for weather stripping having a base portion and one leg (L-shaped channel) or two legs (U-shaped channel) into the shape of a frame having corners to be fitted, for instance, around glass windows. As used herein the term channel material refers to material having a base portion, and one or more leg portions extending in a generally perpendicular direction from the base portion.

The application of ultrasonic energy to simultaneously cut and weld material is well-known in the art, see for instance, U.S. Pat. No. 3,378,429 by E. G. Obeda, entitled "Method and Apparatus for Treating Material with Sonic Energy", issued Apr. 16, 1968 and U.S. Pat. No. 3,939,033 by F. J. Grgach et al, entitled "Ultrasonic Welding and Cutting Apparatus" issued Feb. 17, 1976. These patents refer to the continuous and simultaneous cutting and sealing of thermoplastic sheet material.

The use of so-called "plunge welding" to simultaneously seal and sever material is disclosed for instance in Japanese Pat. No. 250,121 of Mar. 6, 1959; in Zeitschrift fur Schweisstechnik (magazine) No. 1, 1965 article by Nier et al, or in U.S. Pat. No. 4,025,374 issued to S. E. Spindler et al, entitled "Method for Producing Closing Members for Supporting Hooks or Eyes", dated May 24, 1977.

The present disclosure involves the application of ultrasonic plunge welding for forming corners in a continuous strip of flexible thermoplastic channel material. The process described hereafter provides a fast and efficient method of forming such corners.

In the present invention the leg portions of channel material comprising vinyl or other flexible plastic material is flattened and folded over upon itself and disposed on a stationary anvil. An ultrasonic horn designed to be resonant at a frequency between one and 100 kHz, typically at 20 kHz, is urged into intimate contact with the folded leg portions. The frontal surface of the horn contains juxtaposed cutting and sealing edges designed to engage the material at approximately a 45 degree angle from the longitudinal axis of the channel. Responsive to the horn being rendered resonant the channel material in contact with the edges of the horn frontal surface is sealed together and the excess material is severed. Thereafter, the horn is retracted from the material now containing a right angle corner in the sealed region.

An object of this invention is therefore, the provision of an improved method of ultrasonically producing a corner in flexible channel material.

Another object of the invention is the provision of a method of simultaneously cutting and sealing channel material using ultrasonic plunge welding for forming corners in the material.

Further and still other objects of the invention will become more clearly apparent when the following description is read in conjunction with the accompanying drawings.

BRIEF DESCRIPTION OF THE DRAWINGS

FIG. 1 is a perspective view of a portion of a windowpane containing material produced in accordance with the present method;

FIG. 2A is a perspective view of a typical strip of channel material;

FIG. 2B is a perspective view of another strip of channel material;

FIG. 3 is an elevational view of an arrangment for practising the invention;

FIG. 4 is a plan view of the frontal surface of the horn;

FIG. 5 is a plan view of the material having a corner produced in accordance with the invention, and FIG. 6 is an illustration of the channel corner after the application of ultrasonic energy.

DETAILED DESCRIPTION OF THE INVENTION

Referring now to the figures and FIG. 1 in particular, there is shown a pane of glass 10 disposed within a weatherstripping channel 12. The weatherstripping channel 12 may preferably have a U-shaped cross section as shown in FIG. 2A. The channel 12 comprises a base portion 14 and two ribbed leg portions 16 and 18 extending perpendicular from the base. Alternatively, the channel 12', FIG. 2B, may comprise a base portion 14 and a single ribbed leg portion 18, i.e. a L-shaped cross section. Alternatively, the leg portions may be smooth omitting the ribs.

The present invention concerns a method of forming a right or other angle corner 20, FIG. 1, in the strips of channel material. The material itself is usually a flexible vinyl or other suitable thermoplastic material which is readily bendable and having a thickness varying from a fraction of a millimeter to several millimeters. The invention is not inferred to be limited to either vinyl material or channel material used solely for weather stripping, but rather is intended to apply for producing corners in flexible ultrasonically weldable channel material.

Referring now to FIG. 3, in order to form the channel material into a rectangular frame, the material 12 is unwound from a roll 22 a predetermined lenth corresponding to a side dimension of the frame. At the area where a 90 degree angle is to be formed the leg portions 16 and 18 of the measured material are bent outwardly (away from the base), flattened and then folded over with a "U" bend upon itself, the outside surface being exposed in the region of fold 24. The folded over material is then disposed upon a fixture plate 27 resting upon the base (or anvil) 26 of an ultrasonic welding apparatus 28. An ultrasonic welding apparatus suitable for the present purpose is described in U.S. Pat. No. 3,790,059, issued to S. E. Jacke et al, entitled "Ultrasonic Apparatus" dated Feb. 5, 1974. Coupled for motion along a column 30 extending vertically from base 26 are an electroacoustic converter 32 and a horn (or resonator) 34. The converter converts the electrical energy provided from the generator 36 into mechanical vibratory energy and may be constructed in accordance with the teachings found in U.S. Pat. No. 3,328,610, by S. E. Jacke et al, entitled "Sonic Wave Generator" issued June 27, 1967. The horn 34, coupled for receiving the vibratory energy from converter 32, is dimensioned to operate as a half wavelength resonator along its longitudinal axis at the frequency of the electrical energy signal supplied to the converter 32 from electrical generator 36. The frequency of the applied signal is typically in the range between one and 100 kilohertz, and suitably in the ultrasonic frequency range around 20 kHz.

After the folded material is disposed on the plate 27 the frontal surface 37 of horn 34 is urged into intimate contact with the material for simultaneously sealing and cutting the leg portions 16 and 18 of the workpiece. As best seen in FIG. 4, the frontal surface 37 of the horn 34 contains a pair of juxtaposed sealing edges 38 and cutting edges 40 disposed at an approximately 45 degree angle to the longitudinal axis of the channel. The cutting edge 40 is narrower than the sealing edge 38 and extends beyond the height of the sealing edge 38 (see Grgach et al, supra). Of course, in an alternative embodiment the fixture plate 27 may contain the cutting and sealing edges in which case the horn frontal surface will be flat.

In order to provide the corner 20, the base portion 14 of the channel 12 is disposed in the region 42 between the raised sealing edges 38 and cutting edges 40. The flattened leg portions 16 and 18 are extended over the edges 38 and 40.

Responsive to the combination of the force urging the horn 34 toward base 26 and the frontal surface 37 of the horn 34 undergoing vibratory motion in the range from 0.1 to 0.4 millimeters peak-to-peak in the longitudinal direction, the leg portions 16 and 18 are sealed to each other corresponding to the position of sealing edges 38, and the excess material 46 is severed responsive to the knife action of the cutting edge 40. The horn 34 is then retracted away from base 26 and the material is removed resulting in the formation of the welded corner 20 shown in FIG. 5. It should be noted that no weld is made in the leg portion 14 which is merely bent over to form the 90 degree corner 15, see FIG. 6.

The horn 34 may be rendered resonant either prior to contacting the material 12 (so called "pretriggering") or after contacting the material 12. While the above description refers to the sealing and cutting of U-shaped channel material per FIG. 2A, it will be apparent that the same apparatus or an apparatus comprising a horn having only one pair of juxtaposed edges 38, 40 may be used to produce corresponding corners in L-shaped channel material.

Upon completion of a first corner, an additional length of channel material 12 is measured corresponding to the dimension of the adjacent frame edge length and the process is repeated for producing a second corner and so forth until a completed frame is formed. In the event of weather stripping, only three corners of a four sided frame are welded while the fourth corner is left open.

In a modification for forming corners in channel material in which the base portion includes padding or insulating material (i.e. non-planar) the horn and/or fixture plate surface is modified to include a semicircular groove in which the overlapped base portions are seated for allowing the flattened and overlapped leg portions to come into intimate contact with the resonant horn and anvil.

While in the above description a preferred method of forming corners in channel material has been recited and illustrated, modifications and variations may be made without deviating from the broad scope of the present invention which shall be limited solely by the scope of the appended claims.

What is claimed is:

1. Method of producing a corner in a molded or extruded thermoplastic flexible channel material having a base portion and at least one leg comprising:
   flattening the leg outwardly away from the base portion while simultaneously folding the material with a "U" bend upon itself to provide respectively an overlapped base portion and an overlapped leg portion;
   applying ultrasonic energy to the overlapped flattened leg portion for simultaneous sealing and cutting the overlapped leg portion at an oblique angle to the longitudinal axis of said flexible channel material, and
   releasing said flattened and sealed channel material, thereby restoring said channel material to its original shape whereby the material exhibits a formed corner.

2. Method of producing a corner in a molded or extruded thermoplastic flexible channel as set forth in claim 1, said ultrasonic energy being applied by a horn contacting said overlapped leg portion.

3. Method of producing a corner in a molded or extruded thermoplastic flexible channel as set forth in claim 2, said ultrasonic horn being resonant at a predetermined frequency in the range between one and one hundred kilohertz.

4. Method of producing a corner in a molded or extruded thermoplastic flexible channel as set forth in claim 1, said oblique angle being substantially 45 degrees with respect to the longitudinal axis of said channel material.

5. Method of producing a corner in a molded or extruded thermoplastic flexible channel material of U-shaped cross section having a base portion and a pair of legs extending from said base portion comprising:
   flattening the legs outwardly away from the base portion while simultaneously folding the material with a "U" bend upon itself to provide respectively an overlapped base portion and overlapped leg portions;
   applying high frequency vibratory energy in the ultrasonic frequency range to the overlapped flattened leg portions for simultaneous sealing and cutting the overlapped leg portions at an oblique angle to the longitudinal axis of said flexible channel material, and
   releasing said flattened and sealed channel material, thereby restoring said channel material to its original U-shaped cross section but exhibiting a formed corner.

6. Method of producing a corner in a molded or extruded thermoplastic flexible channel as set forth in claim 5, said ultrasonic energy being applied by a horn contacting said overlapped leg portions.

7. Method of producing a corner in a molded or extruded thermoplastic flexible channel as set forth in claim 6, said ultrasonic horn being resonant at a predetermined frequency in the range between one and one hundred kilohertz.

8. Method of producing a corner in a molded or extruded thermoplastic flexible channel as set forth in claim 5, said oblique angle being substantially 45 degrees with respect to the longitudinal axis of said channel material.

* * * * *